(12) United States Patent
Saitoh et al.

(10) Patent No.: US 11,169,389 B2
(45) Date of Patent: Nov. 9, 2021

(54) OPTICAL LAMINATE

(71) Applicant: FUJIFILM CORPORATION, Tokyo (JP)

(72) Inventors: Yukito Saitoh, Kanagawa (JP); Kunihiro Atsumi, Kanagawa (JP); Naoyoshi Yamada, Kanagawa (JP); Daisuke Kashiwagi, Kanagawa (JP); Shigeaki Nimura, Kanagawa (JP); Mitsuyoshi Ichihashi, Kanagawa (JP); Rie Takasago, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 374 days.

(21) Appl. No.: 16/297,743

(22) Filed: Mar. 11, 2019

(65) Prior Publication Data

US 2019/0204614 A1    Jul. 4, 2019

Related U.S. Application Data

(63) Continuation of application No. PCT/JP2017/034255, filed on Sep. 22, 2017.

(30) Foreign Application Priority Data

Sep. 28, 2016  (JP) .............................. JP2016-189328

(51) Int. Cl.
    *G02B 27/28*     (2006.01)
    *G02B 3/00*     (2006.01)
    *G02B 5/30*     (2006.01)

(52) U.S. Cl.
    CPC ........... *G02B 27/285* (2013.01); *G02B 3/005* (2013.01); *G02B 5/3016* (2013.01)

(58) Field of Classification Search
    CPC ...... G02B 27/285; G02B 5/3016; G02B 5/26; G02B 5/201; G02B 3/005; G02F 1/133526; G02F 1/13718; G02F 2201/343
    See application file for complete search history.

(56) References Cited

U.S. PATENT DOCUMENTS

| 6,359,719 B1 * | 3/2002 | Ori .......................... G02B 3/005 349/57 |
|---|---|---|
| 2005/0180017 A1 | 8/2005 | Hara et al. |

(Continued)

FOREIGN PATENT DOCUMENTS

| CN | 1646975 A | 7/2005 |
|---|---|---|
| CN | 101479362 A | 7/2009 |

(Continued)

OTHER PUBLICATIONS

Wikipedia webpage "Cholesteric liquid crystal" (Year: 2015).*

(Continued)

*Primary Examiner* — George G. King
(74) *Attorney, Agent, or Firm* — Solaris Intellectual Property Group, PLLC

(57) ABSTRACT

An optical laminate includes a cholesteric liquid crystal layer and a lenticular lens which is laminated on the cholesteric liquid crystal layer, the cholesteric liquid crystal layer has a plurality of regions which are arranged in a pattern in an arrangement direction of lenses of the lenticular lens and are different from each other in terms of the reflection center wavelength for front incident light, and among the plurality of regions, a region having the shortest reflection center wavelength is disposed at a focus position of the lenticular lens for the front incident light, and among the plurality of regions, a region having a longer reflection center wavelength is disposed further away from the focus position.

6 Claims, 3 Drawing Sheets

(56) References Cited

U.S. PATENT DOCUMENTS

| | | | |
|---|---|---|---|
| 2007/0018585 A1* | 1/2007 | Ijzerman | H04N 13/359 |
| | | | 315/15 |
| 2010/0178508 A1 | 7/2010 | Kasch et al. | |
| 2011/0116010 A1 | 5/2011 | Nagata et al. | |
| 2015/0062490 A1 | 3/2015 | Kwon | |

FOREIGN PATENT DOCUMENTS

| | | |
|---|---|---|
| CN | 102037399 A | 4/2011 |
| JP | H08-15689 A | 1/1996 |
| JP | 2000-305074 A | 11/2000 |
| JP | 2008-309963 A | 12/2008 |

OTHER PUBLICATIONS

International Search Report issued in International Application No. PCT/JP2017/034255 dated Nov. 28, 2017.

Written Opinion of the ISA issued in International Application No. PCT/JP2017/034255 dated Nov. 28, 2017.

English language translation of the following: Office action dated Sep. 3, 2020 from the SIPO in a Chinese patent application No. 201780058293.0 corresponding to the instant patent application. This office action translation is submitted now in order to supplement the understanding of the cited references which are being disclosed in the instant Information Disclosure Statement.

* cited by examiner

OPTICAL LAMINATE

CROSS-REFERENCE TO RELATED APPLICATIONS

This application is a continuation application of International Application No. PCT/JP2017/034255, filed Sep. 22, 2017, the disclosure of which is incorporated herein by reference in its entirety. Further, this application claims priority from Japanese Patent Application No. 2016-189328, filed Sep. 28, 2016, the disclosure of which is incorporated herein by reference in its entirety.

BACKGROUND OF THE INVENTION

1. Field of the Invention

The present invention relates to an optical laminate provided with a cholesteric liquid crystal layer.

2. Description of the Related Art

A cholesteric liquid crystal has a property of selectively reflecting specific circularly polarized light of a specific wavelength and transmitting other wavelengths and other circularly polarized light, and is used for a color filter or a brightness enhancement film of a display device.

A cholesteric liquid crystal layer selectively reflects light having a wavelength corresponding to the period of the helical structure of the liquid crystal. Its selective reflection wavelength varies depending on the incidence angle of light entering from a surface of the cholesteric liquid crystal layer, and the larger the incidence angle of the incident light, the shorter the selective reflection wavelength. This phenomenon is called a short wavelength shift in the cholesteric liquid crystal layer.

JP2000-305074A proposes a laminated structure in which a microlens film is disposed on the light incidence surface side of a cholesteric liquid crystal layer in order to solve the problems of the short wavelength shift due to oblique incident light. JP2000-305074A discloses a configuration that shifts the incident optical axis to the normal line side at the incidence surface by the microlens film (lenticular lens) to reduce the shift of the reflected light to a shorter wavelength side.

SUMMARY OF THE INVENTION

According to the configuration disclosed in JP2000-305074A, incident light entering the laminated structure are refracted by the action of the lens and made incident on the cholesteric liquid crystal layer, and thus the incidence angle at which the rays are made incident on the cholesteric liquid crystal layer can be made smaller than the incidence angle at which the rays enter the laminated structure. As a result, the short wavelength shift can be suppressed. However, there is a limit to the effects of the configuration using the refraction angle. In the optical laminate provided with a cholesteric liquid crystal layer, it is required to further enhance the effect of reducing the shift of reflected light to a shorter wavelength side.

An object of the invention is to provide an optical laminate in which a short wavelength shift of reflected light in a cholesteric liquid crystal layer is suppressed.

An optical laminate comprising: a cholesteric liquid crystal layer; and a lenticular lens which is laminated on the cholesteric liquid crystal layer, in which the cholesteric liquid crystal layer has a plurality of regions which are arranged in a pattern in an arrangement direction of lenses of the lenticular lens and are different from each other in terms of the reflection center wavelength for front incident light, and among the plurality of regions, a region having the shortest reflection center wavelength is disposed at a focus position of the lenticular lens for the front incident light, and among the plurality of regions, a region having a longer reflection center wavelength is disposed further away from the focus position.

Here, the front incident light refers to incident light entering from a normal direction of the surface of the cholesteric liquid crystal layer, and the reflection center wavelength in the cholesteric liquid crystal layer refers to the center wavelength of front reflected light (reflected light reflected in the normal direction) selectively reflected among the front incident light.

In the optical laminate according to the embodiment of the invention, in a lamination direction of the cholesteric liquid crystal layer and the lenticular lens, the region having the shortest reflection center wavelength is preferably disposed at a position overlapping a center of the lens of the lenticular lens, and a region having the longest reflection center wavelength is preferably disposed at a position overlapping a boundary between the lenses of the lenticular lens.

In the optical laminate according to the embodiment of the invention, the plurality of regions preferably have the same width in the arrangement direction of the lenses.

In the optical laminate according to the embodiment of the invention, the plurality of regions may include two types of regions, that is, a short wavelength reflection region of which the reflection center wavelength is relatively short and a long wavelength reflection region of which the reflection center wavelength is relatively long, and the long wavelength reflection region and the short wavelength reflection region may be alternately arranged along the arrangement direction of the lenses of the lenticular lens.

Here, the expressions the reflection center wavelength is relatively short and the reflection center wavelength is relatively long mean that in a case where the reflection center wavelengths of the short wavelength reflection region and the long wavelength reflection region are compared to each other, the reflection center wavelength of the short wavelength reflection region is shorter than the reflection center wavelength of the long wavelength reflection region, and the reflection center wavelength of the long wavelength reflection region is longer than the reflection center wavelength of the short wavelength reflection region.

In a case where the plurality of regions include the two types of regions, the short wavelength reflection region preferably corresponds to the region having the shortest reflection center wavelength, the long wavelength reflection region preferably corresponds to the region having the longest reflection center wavelength. In addition, in the lamination direction of the cholesteric liquid crystal layer and the lenticular lens, the short wavelength reflection region is preferably disposed at a position overlapping a center of the lens of the lenticular lens, and the long wavelength reflection region is preferably disposed at a position overlapping a boundary between the lenses of the lenticular lens.

In a case where the plurality of regions include the two types of regions, a difference between the reflection center wavelengths of the long wavelength reflection region and the short wavelength reflection region is preferably 10 nm to 110 nm.

In the optical laminate according to the embodiment of the invention, the lenticular lens preferably has a lens pitch of 0.2 mm to 2 mm.

An optical laminate according to the embodiment of the invention includes a cholesteric liquid crystal layer and a lenticular lens which is laminated on the cholesteric liquid crystal layer, the cholesteric liquid crystal layer has a plurality of regions which are arranged in a pattern in an arrangement direction of lenses of the lenticular lens and are different from each other in terms of the reflection center wavelength for front incident light, and among the plurality of regions, a region having the shortest reflection center wavelength is disposed at a focus position of the lenticular lens for the front incident light, and among the plurality of regions, a region having a longer reflection center wavelength is disposed further away from the focus position. Due to such a configuration, it is possible to effectively suppress a short wavelength shift of light entering the optical laminate and selectively reflected.

DESCRIPTION OF THE PREFERRED EMBODIMENTS

Figure 1:
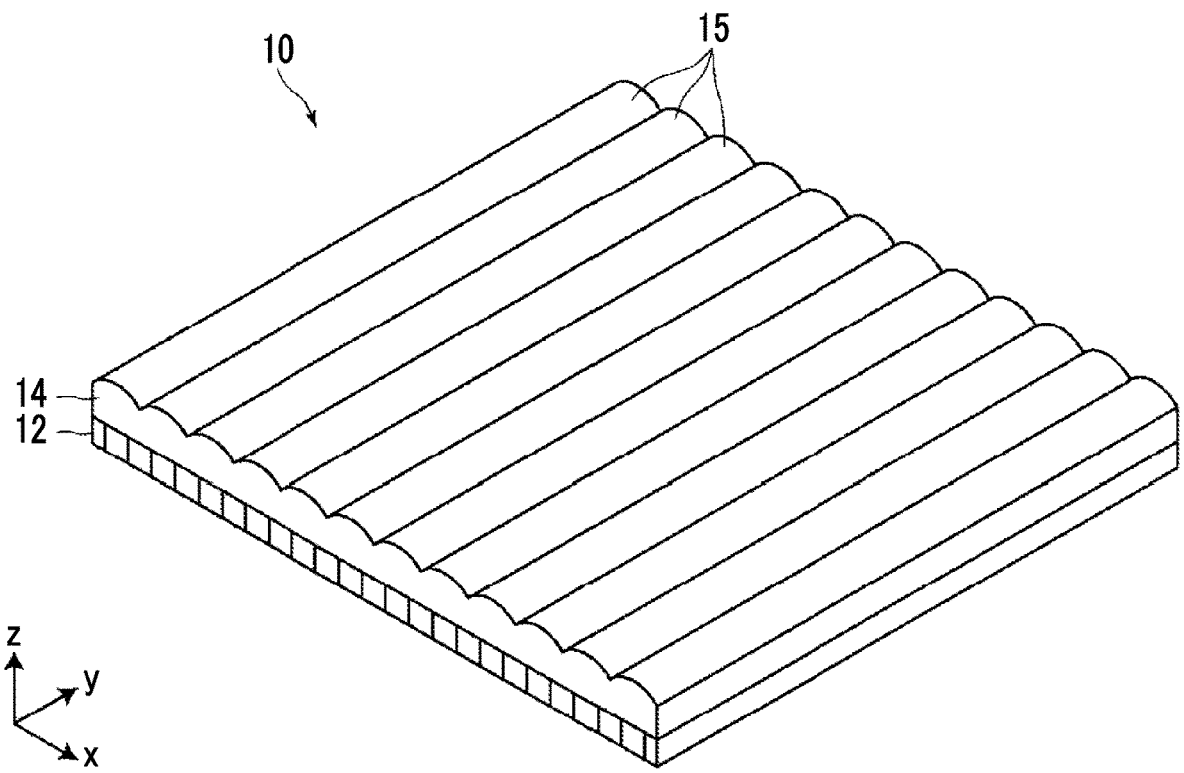
FIG. 1 is a perspective view showing a schematic configuration of an optical laminate according to a first embodiment of the invention.

Hereinafter, embodiments of an optical laminate of the invention will be described with reference to the drawings. In the drawings, the scales of the constituent elements are appropriately changed from the actual ones in order to make the elements easier to see.

Optical Laminate According to First Embodiment

FIG. 1 is a perspective view showing a schematic configuration of an optical laminate 10 according to a first embodiment of the invention. Each of FIGS. 2 and 3 is an enlarged view showing a part of a cross section perpendicularly intersecting with a longitudinal direction of a lens of the optical laminate 10 of FIG. 1.

A lenticular lens 14 is a lens sheet in which a large number of plano-convex cylindrical lenses 15 (hereinafter, also simply referred to as lenses 15) are arranged in an array.

The preferable lens shape of the lenticular lens 14 is not particularly limited, and it is preferable that a lens height h is about 50 μm to 100 μm, a pitch p is about 0.2 mm to 2 mm, and a lens radius r is about 10 μm to 1 mm. A sheet thickness t of the lenticular lens 14 is preferably 10 μm to 2 mm. A lenticular lens with a larger pitch than those which have been used for 3D image display is used.

Figure 2:
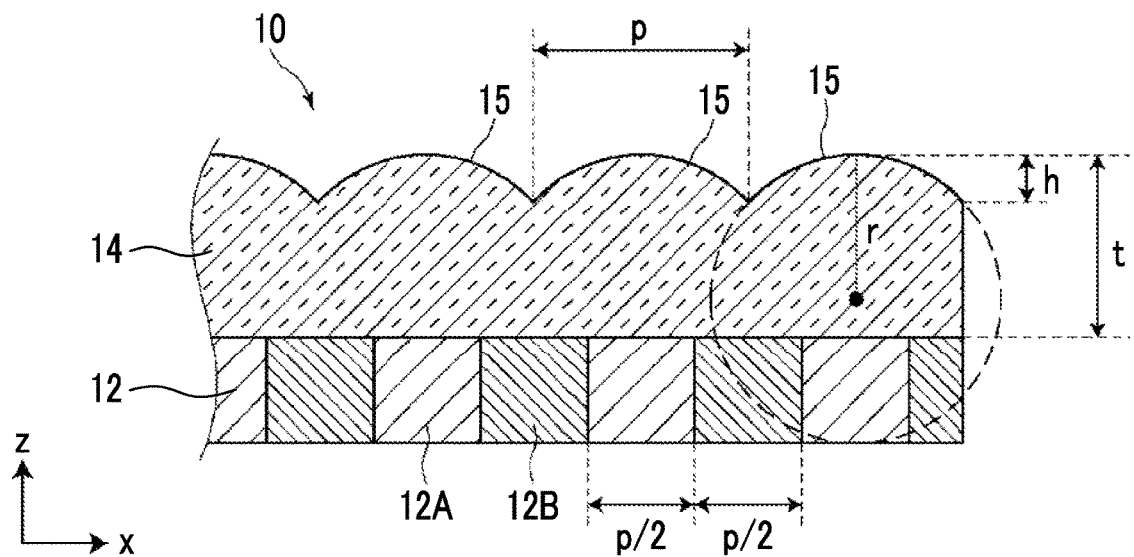
FIG. 2 is an enlarged cross-sectional view showing a part of the optical laminate according to the first embodiment.
Figure 3:
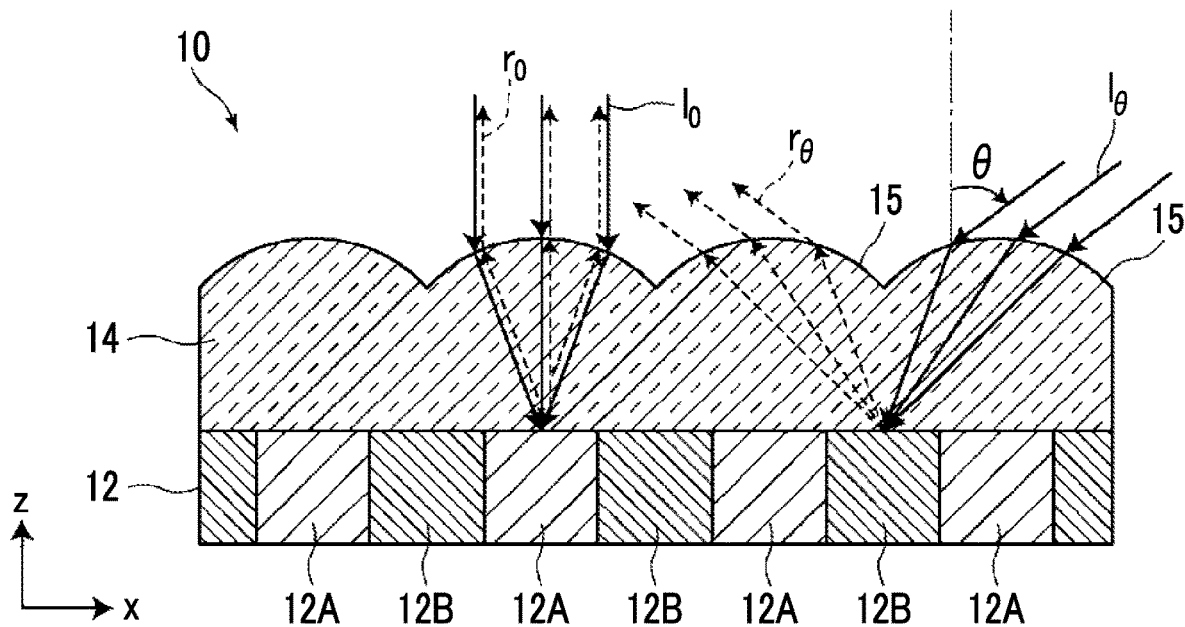
FIG. 3 is an enlarged cross-sectional view showing a part of the optical laminate according to the first embodiment, and is a view for illustrating the relationship between an incidence angle of incident light and a reflection region.

As shown in FIG. 2, the lens height h is a height of a circular arc of the vertical cross-section of the cylindrical lens 15 of the lenticular lens 14, and a radius of the circle including the circular arc is the lens radius r.

As shown in FIG. 2, cholesteric liquid crystal layers 12 of the optical laminate 10 according to this embodiment are arranged in a pattern. That is, two types of regions 12A and 12B having different reflection center wavelengths are alternately arranged along an arrangement direction x of the lenses 15 of the lenticular lens 14. The region 12A is a short wavelength reflection region (hereinafter, referred to as a short wavelength reflection region 12A) where the reflection center wavelength is relatively short, and the region 12B is a long wavelength reflection region (hereinafter, referred to as a long wavelength reflection region 12B) where the reflection center wavelength is relatively long. Both the regions A and B are stripe-like regions extending along a longitudinal direction y of the lens 15 (see FIG. 1).

The thickness of the cholesteric liquid crystal layer 12 is preferably 1 μm to 10 μm.

In the optical laminate 10 according to this embodiment, a width of the short wavelength reflection region 12A is the same as a width of the long wavelength reflection region 12B, and the width is half the lens pitch p. In a lamination direction z of the cholesteric liquid crystal layer 12 and the lenticular lens 14, the short wavelength reflection region 12A is disposed at a position overlapping the center of the lens 15 of the lenticular lens 14, and the long wavelength reflection region 12B is disposed at a position overlapping a boundary between the adjacent lenses 15 of the lenticular lens 14. Specifically, the cholesteric liquid crystal layer 12 and the lenticular lens 14 are laminated such that the center in a width direction of the short wavelength reflection region 12A coincides with the center of the lens 15 and the center in a width direction of the long wavelength reflection region 12B coincides with the boundary between the lenses 15.

In the optical laminate 10 according to the embodiment of the invention, as shown in FIG. 3, the short wavelength reflection region 12A is disposed at a focus position of the lenticular lens 14 for front incident light and the long wavelength reflection region 12B is disposed at both sides of the short wavelength reflection region 12A, which are separated from the focus position. A focus for incident light $I_\theta$ obliquely entering the lenticular lens 14 at a predetermined incidence angle θ is positioned in the long wavelength reflection region 12B. In this case, the predetermined incidence angle θ may be appropriately set with respect to a desired viewing angle φ and for example, the incidence angle θ is preferably set within a range of $\varphi/2 \leq \theta \leq \varphi/3$ with respect to the viewing angle φ.

In this example, the configuration is provided such that the focus is positioned on a surface of the cholesteric liquid crystal layer 12 on the side of the lenticular lens 14. However, the light entering at the same incidence angle may be made incident on the same region, and the focus may be positioned inside the cholesteric liquid crystal layer 12.

As shown in FIG. 3, when light (front incident light $I_0$) enters the optical laminate 10 from the front, reflected light $r_0$ of a reflection wavelength region according to the incidence angle to the short wavelength reflection region 12A is selectively reflected. Furthermore, when light at the incidence angle θ (oblique incident light $I_\theta$) enters the optical laminate 10, reflected light $r_\theta$ of a reflection wavelength region according to the incidence angle to the long wavelength reflection region 12B is selectively reflected.

In a case where the front incident light $I_0$ enters the short wavelength reflection region 12A via the lens 15, the incident light may enter at an incidence angle that is not 0° as shown in FIG. 3 by the action of the lens 15, and thus the reflected light $r_0$ includes light shifted to a shorter wavelength side than the reflection center wavelength of the short wavelength reflection region 12A. However, in this case, the short wavelength shift can be suppressed to be sufficiently smaller than a short wavelength shift due to normal oblique incident light.

The reflected light $r_\theta$ in a case where the oblique incident light $I_\theta$ enters the long wavelength reflection region 12B via the lens 15 at a certain incidence angle has a reflection center wavelength shifted to a shorter wavelength than a reflection center wavelength of the long wavelength reflection region 12B for front incident light. In a case where the long wavelength reflection region 12B is set such that the reflection center wavelength shifted to a shorter wavelength is substantially equal to the reflection center wavelength of the short wavelength reflection region 12A for front incident light, the short wavelength shift in the whole optical laminate can be remarkably reduced in comparison with that in a conventional uniform cholesteric liquid crystal layer.

A difference $\Delta\lambda$ in the reflection center wavelength between the short wavelength reflection region 12A and the long wavelength reflection region 12B may be appropriately set according to a set value of a predetermined oblique incidence angle $\theta$ which is determined depending on a desired viewing angle. For example, in a case where $\theta$ is 45°, $\Delta\lambda$ is preferably about 10 nm to 110 nm, more preferably 40 nm to 80 nm, and even more preferably 50 nm to 70 nm.

Figure 4:
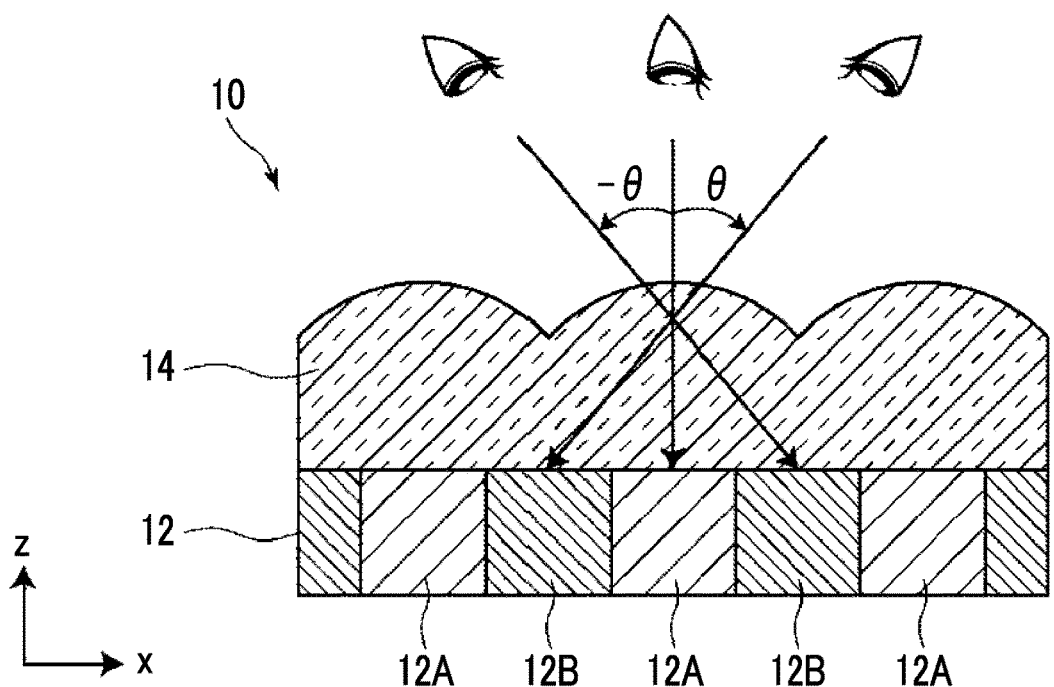
FIG. 4 is a schematic cross-sectional view for illustrating the relationship between an incident angle of incident light and a reflection region in the optical laminate according to the first embodiment.

As shown in FIG. 4, in the cholesteric liquid crystal layer 12, the short wavelength reflection region and the long wavelength reflection region are alternately arranged such that the center of the lens coincides with the center of the short wavelength reflection region A, and the boundary between the lens coincides with the center of the long wavelength reflection region B, so that in a case where the magnitude of the incidence angle is $\theta$, reflected light from the region B is observed even in a case where orientation is different, that is, irrespective of whether the incidence angle is $\theta$ or $-\theta$.

In the above-described embodiment, the widths of the regions A and B are set to be the same. However, even in a case where the regions A and B have different widths, the sum of the widths of the regions A and B may coincide with the lens pitch p, the center of the lens 15 of the lenticular lens 14 may coincide with the region A, and the boundary between the lenses 15 may coincide with the region B.

In the above-described embodiment, the cholesteric liquid crystal layer includes two types of regions, that is, the short wavelength reflection region A and the long wavelength reflection region B. However, in the optical laminate according to the embodiment of the invention, the cholesteric liquid crystal layer may have three or more types of regions which are arranged in a pattern in the arrangement direction of the lenses of the lenticular lens and are different from each other in terms of the reflection center wavelength for front incident light.

Optical Laminate According to Second Embodiment

Figure 5:
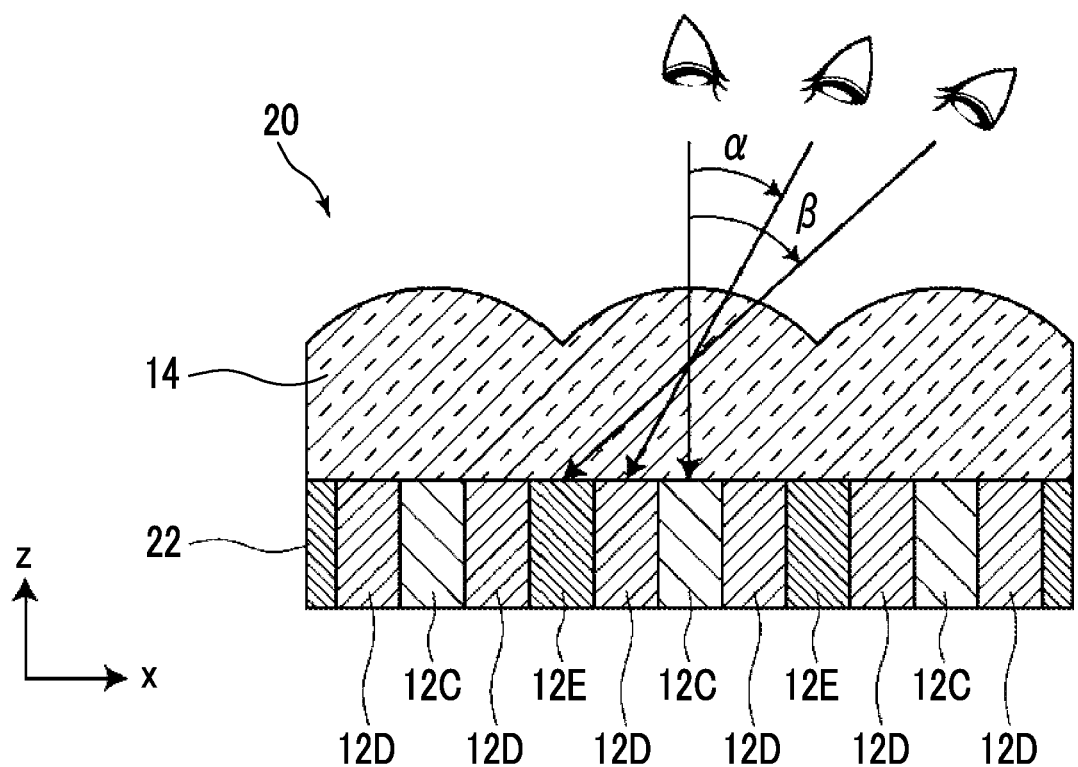
FIG. 5 is a schematic cross-sectional view showing a schematic configuration of an optical laminate according to a second embodiment of the invention.

FIG. 5 is a schematic cross-sectional view of an optical laminate 20 according to a second embodiment of the invention.

The optical laminate 20 according to this embodiment has a cholesteric liquid crystal layer 22 and a lenticular lens 14 which is disposed on the light incidence surface side of the cholesteric liquid crystal layer 22. The lenticular lens 14 is similar to that of the optical laminate 10 according to the first embodiment.

The cholesteric liquid crystal layer 22 of the optical laminate 20 has three types of regions 12C to 12E which are arranged in a pattern in an arrangement direction x of lenses 15 of the lenticular lens 14 and are different from each other in terms of the reflection center wavelength for front incident light. All the first to third regions 12C to 12E are stripe-like regions extending along a longitudinal direction of the lens 15. Since a reflection center wavelength $\lambda c$ of the first region 12C is the shortest, and a reflection center wavelength $\lambda e$ of the third region 12E is the longest, a reflection center wavelength $\lambda d$ of the second region 12D has a relationship represented by $\lambda c < \lambda d < \lambda e$ with $\lambda c$ and $\lambda e$. Differences $\lambda e - \lambda d$ and $\lambda d - \lambda c$ in the reflection center wavelength between the neighboring regions may be appropriately set according to a desired viewing angle, and is, for example, 10 nm to 60 nm.

Among the first to third regions 12C to 12E, the region 12C having the shortest reflection center wavelength is disposed at a focus position of the lenticular lens 14 for front incident light, and among the first to third regions 12C to 12E, a region having a longer reflection center wavelength is disposed further away from the focus position. As described above, in the invention, in a case where the cholesteric liquid crystal layer has a plurality of regions having different reflection center wavelengths for front incident light, a region having the shortest reflection center wavelength among the plurality of regions is disposed at a focus position of the lenticular lens for front incident light, and among the plurality of regions, a region having a longer reflection center wavelength is disposed further away from the focus position.

In this example, the regions 12C to 12E have the same width, and the width of each of the regions 12C to 12E is ¼ of the lens pitch. The cholesteric liquid crystal layer 22 and the lenticular lens 14 are laminated such that the center in a width direction of the first region 12C having the shortest center wavelength coincides with the center of the lens 15, the center in a width direction of the third region 12E having the longest reflection center wavelength among the three regions coincides with the boundary between the adjacent lenses 15, and the second region 12D is positioned between the first region 12C and the third region 12E.

As shown in FIG. 5, front incident light enters the first region 12C, oblique incident light at an incidence angle $\alpha$ enters the second region 12D, and oblique incident light at an incident angle $\beta$ larger than the incidence angle $\alpha$ enters the third region 12E. The incidence angle of the incident light to each of the regions 12C to 12E corresponds to the incidence angle to the optical laminate 20. The principle thereof is similar to that described in the first embodiment. In the second region 12D and the third region 12E, a reflection center wavelength shifted to a shorter wavelength than the reflection center wavelength for the front incident light is selectively reflected. In a case where the second region 12D and the third region 12E are adjusted such that the reflection center wavelength for light entering at the incidence angle $\alpha$ or the incidence angle $\beta$, shifted to a shorter wavelength, is equal to the reflection center wavelength of the first region 12C for front incident light, the short wavelength shift in the whole optical laminate can be greatly suppressed.

Since it is possible to more finely adjust the reflection center wavelength according to the incidence angle to each region in the optical laminate 20 according to the second embodiment having a patterned cholesteric liquid crystal layer composed of three types of regions than in the optical laminate 10 according to the first embodiment having a patterned cholesteric liquid crystal layer composed of two types of regions, the short wavelength shift suppression effect is higher in the optical laminate 20 than in the optical laminate 10.

Hereinafter, materials of the respective layers constituting the optical laminates 10 and 20 will be described.

Lenticular Lens

Examples of the resin constituting the lenticular lens 14 include a polymethyl methacrylate resin (PMMA), a polycarbonate resin, a polystyrene resin, a methacrylate-styrene copolymer resin (MS resin), an acrylonitrile-styrene copolymer resin (AS resin), a polypropylene resin, a polyethylene resin, a polyethylene terephthalate resin, a glycol-modified polyethylene terephthalate resin, a polyvinyl chloride resin (PVC), a thermoplastic elastomer, copolymers thereof, and a cycloolefin polymer. In view of easiness of melting extrusion, for example, a resin having a low melt viscosity such as a polymethyl methacrylate resin (PMMA), a polycarbonate resin, a polystyrene resin, a methacrylate-styrene copolymer resin (MS resin), a polyethylene resin, a polyethylene terephthalate resin, and a glycol-modified polyethylene terephthalate resin is preferably used, and in view of easiness of transfer, cracking resistance of the sheet, durability of the pattern, and the like, a glycol-modified polyethylene terephthalate resin is more preferably used.

As a method of forming the lenticular lens 14, for example, a method described in paragraph [0017] of JP2012-091501A can be used, and other known methods can be appropriately used.

Cholesteric Liquid Crystal Layer

The cholesteric liquid crystal layer is a light reflecting layer which is obtained by fixing a cholesteric liquid crystalline phase fixed in a cholesteric phase state in which a rod-like liquid crystal compound or a disk-like liquid crystal compound is helically aligned. The cholesteric liquid crystalline phase is a liquid crystalline phase in which a rod-like liquid crystal compound or a disk-like liquid crystal compound is helically aligned. The cholesteric liquid crystalline phase has a property of selectively reflecting a specific wavelength region and specific polarized light, out of front incident light. The reflection center wavelength can be adjusted by changing the pitch or the refractive index of the helical structure in the above cholesteric liquid crystalline phase. The pitch of the helical structure can be easily adjusted by changing the amount of a chiral agent to be added. Detailed description thereof is given as in Fuji Film research & development No. 50 (2005), p. 60 to 63. The pitch can also be adjusted by conditions such as a temperature, an illuminance, and an irradiation time in fixation of the cholesteric liquid crystalline phase.

A reflective polarizer derived from the cholesteric liquid crystal layer selectively reflects either one of right-handed circularly polarized light or left-handed circularly polarized light in a selected reflection wavelength region, and transmits the other circularly polarized light.

In order to form a plurality of regions having different reflection center wavelengths in a pattern in the cholesteric liquid crystal layer, a cholesteric liquid crystal material, whose reflection center wavelength can be changed by an exposure amount of ultraviolet rays during curing, may be used. By uniformly applying such a cholesteric liquid crystal material to a support and changing an exposure amount of ultraviolet rays for each region using a mask having predetermined openings, a patterned cholesteric liquid crystal layer having a plurality of regions having different reflection center wavelengths can be formed. In addition, polymerizable compositions, each having a different amount of a chiral agent added, may be prepared, and repeatedly applied and cured for each region to form a patterned cholesteric liquid crystal layer.

Polymerizable Liquid Crystal Composition
(Cholesteric Liquid Crystal Material)

A polymerizable liquid crystal composition for forming a cholesteric liquid crystal layer contains a rod-like or disk-like liquid crystal compound and at least a chiral agent, and may further contain other components such as an alignment control agent, a polymerization initiator, and an alignment aid.

Rod-Like Liquid Crystal Compound

As the rod-like liquid crystal compound, azomethines, azoxys, cyanobiphenyls, cyanophenyl esters, benzoates, cyclohexanecarboxylic acid phenyl esters, cyanophenylcyclohexanes, cyano-substituted phenylpyrimidines, alkoxy-substituted phenylpyrimidines, phenyl dioxanes, tolans, and alkenylcyclohexylbenzonitriles are preferably used. In addition to the above low-molecular liquid crystal compounds, high-molecular liquid crystal compounds can also be used.

The alignment of the rod-like liquid crystal compound is more preferably fixed by polymerization, and as a polymerizable rod-like liquid crystal compound, compounds described in Makromol. Chem., Vol. 190, p. 2255 (1989), Advanced Materials Vol. 5, p. 107 (1993), U.S. Pat. Nos. 4,683,327A, 5,622,648A, 5,770,107A, WO95/022,586A, WO95/024,455A, WO97/000,600A, WO98/023,580A, WO98/052,905A, JP1989-272551A (JP-H01-272551A), JP1994-016616A (JP-H06-016616A), JP1995-110469A (JP-H07-110469A), JP1999-080081A (JP-H11-080081A), JP2001-064627A, and the like can be used. Furthermore, as the rod-like liquid crystal compound, for example, those described in JP1999-513019A (JP-H11-513019A) and JP2007-279688A can also be preferably used.

Disk-Like Liquid Crystal Compound

As the disk-like liquid crystal compound, for example, those described in JP2007-108732A and JP2010-244038A can be preferably used.

Hereinafter, preferable examples of the disk-like liquid crystal compound will be shown, but the invention is not limited thereto.

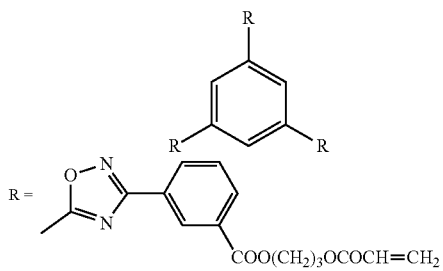

Compound 1

-continued

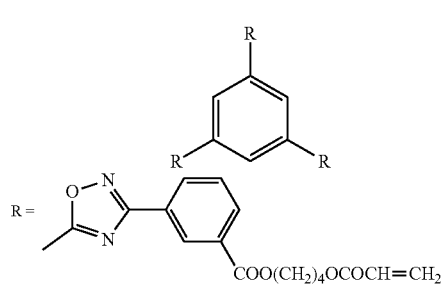

Compound 2

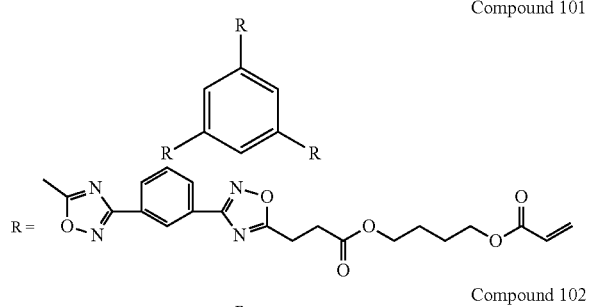

Compound 101

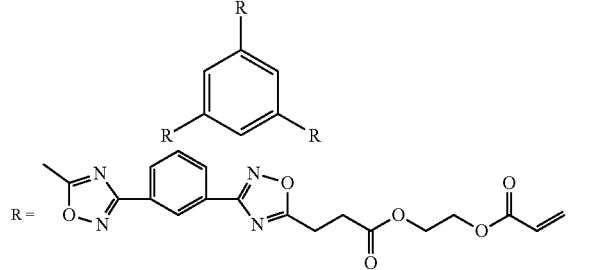

Compound 102

Other Components

The composition which is used for forming a cholesteric liquid crystal layer may contain other components such as a chiral agent, an alignment control agent, a polymerization initiator, and an alignment aid, in addition to the disk-like liquid crystal compound. A known material can be used as any of them.

Chiral Agent

The type of the chiral agent is not particularly limited. The chiral agent may be liquid crystalline or non-liquid crystalline. The chiral agent can be selected from various known chiral agents (for example, Liquid Crystal Device Handbook, chapter 3, paragraph 4-3, Chiral Agent for twisted nematic (TN) and super twisted nematic (STN), Page 199, Japan Society for the Promotion of Science edited by 142nd committee, 1989). The chiral agent generally contains an asymmetric carbon atom, but an axial asymmetric compound or a planar asymmetric compound containing no asymmetric carbon atom can also be used as the chiral agent. Examples of the axial asymmetric compound or the planar asymmetric compound include binaphthyl, helicene, paracyclophane, and derivatives thereof. The chiral agent may have a polymerizable group.

The chiral agents may be used alone or in combination of two or more types thereof.

In the manufacturing of a cholesteric liquid crystal layer, in a case where the size of the helical pitch of a cholesteric liquid crystalline phase is controlled by light irradiation, a chiral agent which is sensitive to light and can change the helical pitch of the cholesteric liquid crystalline phase (hereinafter, also referred to as a photosensitive chiral agent) is preferably used.

The photosensitive chiral agent is a compound having a structure which changes by absorbing light and capable of changing the helical pitch of the cholesteric liquid crystalline phase. As the compound, a compound which causes at least one of a photoisomerization reaction, a photodimerization reaction, or a photolytic reaction is preferable.

The compound which causes a photoisomerization reaction refers to a compound which causes stereoisomerization or structural isomerization by the action of light. Examples of the photoisomerizable compound include an azobenzene compound and a spiropyran compound.

The compound which causes a photodimerization reaction refers to a compound which undergoes an addition reaction between two groups by light irradiation and cyclizes. Examples of the photodimerizing compound include cinnamic acid derivatives, coumarin derivatives, chalcone derivatives, and benzophenone derivatives.

Preferable examples of the photosensitive chiral agent include a chiral agent represented by Formula (I). The chiral agent can change the alignment structure such as the helical pitch (twist force, twist angle of the helix) of the cholesteric liquid crystalline phase depending on the amount of light applied.

Formula (I)

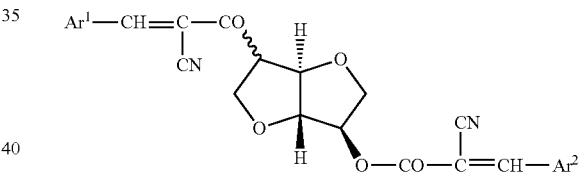

In Formula (I), $Ar^1$ and $Ar^2$ each represent an aryl group or a heteroaromatic ring group.

The aryl group represented by $Ar^1$ and $Ar^2$ may have a substituent, and the total number of carbon atoms is preferably 6 to 40, and more preferably 6 to 30. The substituent is preferably, for example, a halogen atom, an alkyl group, an alkenyl group, an alkynyl group, an alkoxy group, a hydroxyl group, an acyl group, an alkoxycarbonyl group, an aryloxycarbonyl group, an acyloxy group, a carboxyl group, a cyano group, or a heterocyclic group, and more preferably a halogen atom, an alkyl group, an alkenyl group, an alkoxy group, a hydroxyl group, an acyloxy group, an alkoxycarbonyl group, or an aryloxycarbonyl group.

Among the aryl groups, an aryl group represented by Formula (III) or (IV) is preferable.

Formula (III)

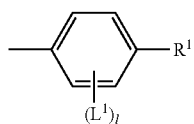

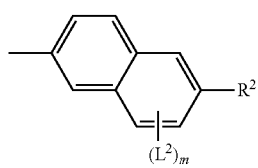

Formula (IV)

R¹ in Formula (III) and R² in Formula (IV) each independently represent a hydrogen atom, a halogen atom, an alkyl group, an alkenyl group, an alkynyl group, an aryl group, a heterocyclic group, an alkoxy group, a hydroxyl group, an acyl group, an alkoxycarbonyl group, an aryloxycarbonyl group, an acyloxy group, a carboxyl group, or a cyano group. Among these, a hydrogen atom, a halogen atom, an alkyl group, an alkenyl group, an aryl group, an alkoxy group, a hydroxyl group, an alkoxycarbonyl group, an aryloxycarbonyl group, or an acyloxy group is preferable, and an alkoxy group, a hydroxyl group, or an acyloxy group is more preferable.

L¹ in Formula (III) and L² in Formula (IV) each independently represent a halogen atom, an alkyl group, an alkoxy group, or a hydroxyl group. An alkoxy group or a hydroxyl group having 1 to 10 carbon atoms is preferable.

l represents an integer of 0 to 4, and is preferably 0 or 1.
m represents an integer of 0 to 6, and is preferably 0 or 1.
In a case where l and m are 2 or more, L¹ and L² may represent groups different from each other.

The heteroaromatic ring group represented by Ar¹ and Ar² may have a substituent, and the total number of carbon atoms is preferably 4 to 40, and more preferably 4 to 30. The substituent is preferably, for example, a halogen atom, an alkyl group, an alkenyl group, an alkynyl group, an aryl group, an alkoxy group, a hydroxyl group, an acyl group, an alkoxycarbonyl group, an aryloxycarbonyl group, an acyloxy group or a cyano group, and more preferably a halogen atom, an alkyl group, an alkenyl group, an aryl group, an alkoxy group, or an acyloxy group. Examples of the heteroaromatic ring group include a pyridyl group, a pyrimidinyl group, a furyl group, and a benzofuranyl group. Among these, a pyridyl group or a pyrimidinyl group is preferable.

Solvent

As a solvent of the composition for forming a cholesteric liquid crystal layer, an organic solvent is preferably used. Examples of the organic solvent include amides (e.g., N,N-dimethylformamide), sulfoxides (e.g., dimethylsulfoxide), heterocyclic compounds (e.g., pyridine), hydrocarbons (e.g., benzene and hexane), alkyl halides (e.g., chloroform and dichloromethane), esters (e.g., methyl acetate and butyl acetate), ketones (e.g., acetone, methyl ethyl ketone, and cyclohexanone), and ethers (e.g., tetrahydrofuran and 1,2-dimethoxyethane). Alkyl halides and ketones are preferable. Two or more types of organic solvents may be used in combination.

Application and Curing of Polymerizable Liquid Crystal Composition

In order to apply the polymerizable liquid crystal composition, the polymerizable liquid crystal composition is allowed to be in a solution state with a solvent, or is turned into a liquid material such as a melt by heating, and the resulting material is applied by a proper method such as a roll coating method, a gravure printing method, or a spin coating method. The polymerizable liquid crystal composition can also be applied by various methods such as a wire bar coating method, an extrusion coating method, a direct gravure coating method, a reverse gravure coating method, and a die-coating method. A coating film can also be formed by discharging a liquid crystal composition from a nozzle using an ink jet apparatus.

Thereafter, the polymerizable liquid crystal composition is cured to maintain and fix the alignment state of molecules of the liquid crystal compound. The curing is preferably performed by a polymerization reaction of a polymerizable group introduced into the liquid crystal molecule.

After the application of the polymerizable liquid crystal composition and before the polymerization reaction for curing, the coating film may be dried by a known method. For example, it may be dried by leaving or heating.

The liquid crystal compound molecules in the polymerizable liquid crystal composition may be aligned in the steps of applying and drying the polymerizable liquid crystal composition.

Next, other layers which can be provided in the optical laminate will be described.

Support

As the support, a transparent support is preferable, and examples thereof include polyacrylic resin films such as polymethyl methacrylate, cellulose resin films such as cellulose triacetate, and cycloolefin polymer films [for example, trade name "ARTON" manufactured by JSR Corporation, and trade name "ZEONOR" manufactured by ZEON Corporation]. The support is not limited to a flexible film, and may be a non-flexible substrate such as a glass substrate.

The optical laminate according to the embodiment of the invention may be used while being supported by a support during film formation. Otherwise, the support during film formation may be a temporary support, and the optical laminate may be transferred to another support and used after peeling of the temporary support.

Alignment Layer

An alignment layer may be provided on a film forming surface of the cholesteric liquid crystal layer. The alignment layer can be provided by means such as rubbing of an organic compound (preferably a polymer), oblique vapor deposition of an inorganic compound, or formation of a layer having microgrooves. Alignment layers have also been known in which alignment functions are generated by application of an electric field, application of a magnetic field, or light irradiation. The alignment layer is preferably formed by rubbing a surface of a polymer film. The alignment layer may be peeled off together with the support.

Depending on the type of the polymer used for the support, it is possible to make the support to function as an alignment layer through a direct alignment treatment (for example, rubbing) without providing an alignment layer. Examples of such a support include polyethylene terephthalate (PET).

Adhesion Layer (Pressure Sensitive Adhesive Layer)

In this specification, "adhesion" is a concept including "pressure-sensitive adhesion".

In a case where the cholesteric liquid crystal layer and the lenticular lens are laminated, these may be laminated via an adhesion layer.

Examples of the pressure sensitive adhesive which is used for the adhesion layer include resins such as polyester resins, epoxy resins, polyurethane resins, silicone resins, and acrylic resins. These may be used alone or in combination of two or more types thereof. Acrylic resins are particularly preferable since these are excellent in reliability such as water resistance, heat resistance, and light resistance and have good adhesion properties and transparency, and the refractive index is easily adjusted so as to be suitable for a liquid crystal display.

A sheet-like photocurable pressure sensitive adhesive (described in TOAGOSEI GROUP RESEARCH ANNUAL REPORT 11, TREND 2011, No. 14) can also be used as the adhesion layer. It facilitates bonding between optical films like a pressure sensitive adhesive, is crosslinked and cured by ultraviolet rays (UV), and has improved storage modulus of elasticity, adhesion properties, and heat resistance. Adhesion using the sheet-like photocurable pressure sensitive adhesive is a method suitable for the invention.

The optical laminate can be formed by respectively forming a lenticular lens and a patterned cholesteric liquid crystal layer as described above and by then bonding them to each other.

After a cholesteric liquid crystal material (polymerizable composition) is applied to the plane side of the lenticular lens, ultraviolet rays are made incident from the front from the lens surface side of the lenticular lens, and the irradiation dose is adjusted to form a region having a predetermined reflection center wavelength in the focus region. In addition, ultraviolet rays are made incident from the lens surface side at a certain incidence angle, and the irradiation dose is adjusted to form a region having a longer reflection center wavelength than the region formed previously in the focus region, so that a patterned cholesteric liquid crystal layer can be formed. In addition, in a case where ultraviolet rays are applied to the surface on the lens surface side from the front or obliquely, and then applied to the entire surface from the other surface, a difference may be generated for each region in the total ultraviolet irradiation dose. Accordingly, the patterned cholesteric liquid crystal layer can also be formed with this method.

EXAMPLES

Hereinafter, examples and comparative examples of the optical laminate according to the embodiment of the invention will be described.

A lenticular lens (lenticular sheet) was formed, a cholesteric liquid crystal layer was formed on an alignment layer provided on a glass substrate, and both the lenticular lens and the cholesteric liquid crystal layer were bonded to each other to produce optical laminates of examples and comparative examples. Details thereof will be described below.

Example 1

A method of forming an optical laminate of Example 1 will be described.

Formation of Lenticular Lens (1) A biaxially stretched polyethylene terephthalate (PET) film (manufactured by Fujifilm Corporation) having a thickness of 188 μm as a transparent support was inserted between a mirror surface roll (φ: 350 mm, surface temperature: 15° C.) and a nip roll at 10 m/min, and a glycol-modified polyethylene terephthalate resin PETG (manufactured by SK Chemicals) and an adhesive resin (ADMER, manufactured by Mitsui Chemicals) as an undercoat layer were co-extruded and supplied between the PET film and the mirror surface roll from a T-die (discharge width: 350 mm) set to have a temperature of 280° C. such that the measured resin temperature was 260° C. to 280° C. Thus, a resin sheet in which the undercoat layer (thickness: 220 μm) comprising the adhesive resin layer and the PETG layer in this order was formed on the PET film was wound.

(2) The resin sheet in which the undercoat layer was installed on the PET film was unwound at 10 m/min and inserted between an embossing roll (φ: 350 mm, 40° C.) with a lenticular lens shape (radius: 150 μm, lens height: 70 μm, pitch: 254 μm) and a nip roll, and a glycol-modified polyethylene terephthalate resin PETG (manufactured by SK Chemicals) and an adhesive resin (ADMER, manufactured by Mitsui Chemicals) were co-extruded from a T-die (discharge width: 330 mm) set to have a temperature of 280° C. such that the measured resin temperature was 260° C. to 280° C. The resins were supplied and laminated between the resin sheet and the embossing roll, and a lenticular sheet (thickness: 340 μm) comprising a lenticular lens was obtained.

The lenticular sheet formed according to the above-described procedure has a configuration in which a lenticular lens layer comprising: the undercoat layer comprising the adhesive resin layer and the PETG layer in this order; the adhesive resin layer; and the PETG layer in this order is laminated on the PET film.

Formation of Patterned Cholesteric Liquid Crystal Layer

A patterned cholesteric liquid crystal layer in which a region A having a relatively short reflection center wavelength and a region B having a relatively long reflection center wavelength were alternately arranged was formed using a cholesteric liquid crystal material, whose reflection center wavelength can be changed by the intensity of ultraviolet rays.

First, a polymerizable liquid crystal composition (polymerizable liquid crystal coating liquid) for a cholesteric liquid crystal layer was prepared. The components of the polymerizable liquid crystal coating liquid were as follows.

| (Components of Polymerizable Liquid Crystal Coating Liquid) | |
|---|---|
| Rod-Like Liquid Crystal Compound (M-1) | 85 parts by mass |
| Rod-Like Liquid Crystal Compound (M-2) | 15 parts by mass |
| Rod-Like Liquid Crystal Compound (M-3) | 1 part by mass |
| Chiral Agent LC-756 (manufactured by BASF SE) | 3.5 parts by mass |
| Chiral Agent (A-1) | 1.5 parts by mass |
| Air-Interfacial Alignment Agent (A-2) | 0.01 parts by mass |
| Polymerization Initiator Irg 819 (manufactured by BASF SE) | 5 parts by mass |

Rod-Like Liquid Crystal Cmpound (M-1)

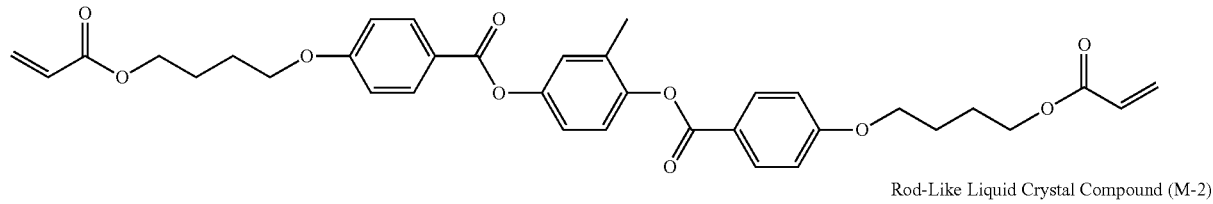

Rod-Like Liquid Crystal Compound (M-2)

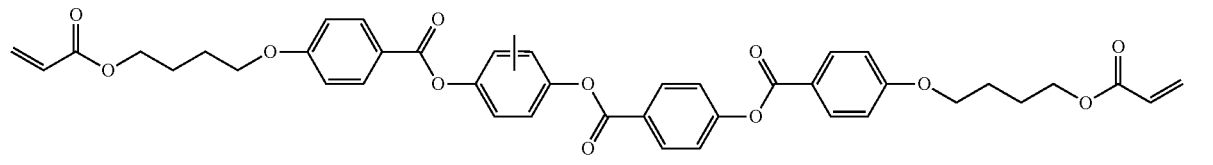

Rod-Like Liquid Crystal Compound (M-3)

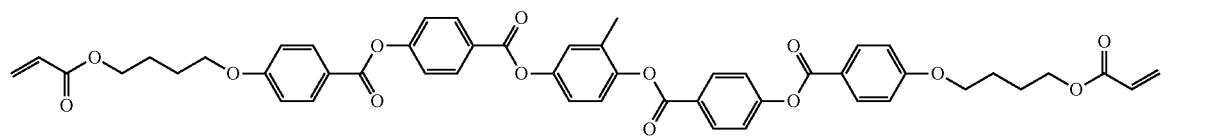

Chiral Agent (A-1)

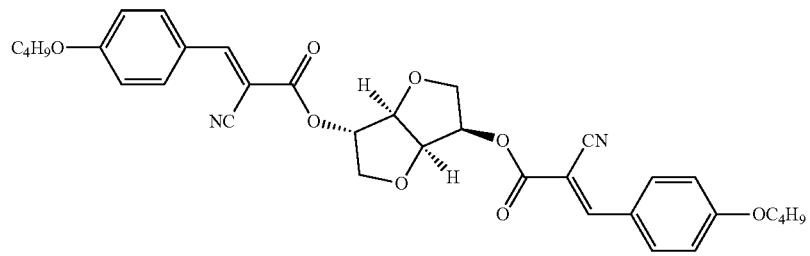

Air-Interfacial Alignment Agent (A-2)

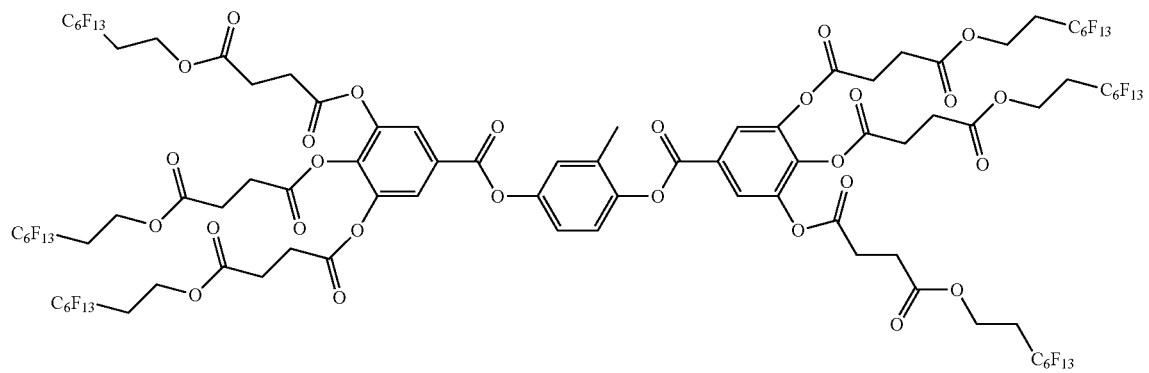

Rubbing (rayon cloth, pressure: 0.1 kgf (0.98 N), rotation speed: 1,000 rpm, transport speed: 10 m/min, number of times: one reciprocation) was performed on one surface of a PET film (manufactured by Fujifilm Corporation, thickness: 75 μm) as a support.

Next, the polymerizable liquid crystal coating liquid prepared as above was applied to the rubbed surface of the PET film at room temperature using a wire bar such that the thickness of the dried film was 4.0 μm.

The obtained coating film was dried at room temperature for 30 seconds, and then heated for 1 minute under an atmosphere at 85° C. to align the liquid crystal compound.

Next, using a striped mask (product of stainless steel) having a pitch of 127 μm (the width of a stripe-like opening and the width between openings are both 127 μm), irradiation was adjusted so as to irradiate the region B with light, and ultraviolet (UV) exposure was performed using a 365 nm band pass filter with an output of 60% of a D-bulb (lamp: 90 mW/cm$^2$) manufactured by Fusion UV Systems, Inc., such that the exposure amount was 5 mJ/cm$^2$.

Next, without the mask, the exposed coating film was further similarly UV-exposed using a 365 nm band pass filter at 40° C. for 5 seconds with an output of 190% of a D-bulb (lamp: 90 mW/cm$^2$) manufactured by Fusion UV Systems, Inc., such that the entire coating surface was irradiated with light, and thus a cholesteric liquid crystal layer was formed. This cholesteric liquid crystal layer is a patterned cholesteric liquid crystal layer in which stripe-like regions A and B having a width corresponding to the pitch of the mask are alternately arranged. The reflection center wavelengths of the region A having a relatively short reflection center wavelength and the region B having a relatively long reflection center wavelength in the patterned cholesteric liquid crystal layer were 550 nm and 560 nm, respectively. Here, the reflection center wavelength is related to light (front incident light) entering from a normal direction of the cholesteric liquid crystal layer.

The lenticular sheet and the patterned cholesteric liquid crystal layer formed as described above were laminated and bonded to form an optical laminate of Example 1. In this case, a longitudinal direction of the cylindrical lens of the lenticular sheet was made to coincide with a longitudinal direction of the stripe pattern of the cholesteric liquid crystal layer, such that a top of the cylindrical lens coincided with a center in a width direction of the region A.

Specifically, under an optical microscope, the top of the cylindrical lens was made to coincide with the center position in the width direction of the region A, and these were bonded to each other with a pressure sensitive adhesive (SK DYNE 2057, manufactured by Soken Chemical & Engineering Co., Ltd.).

Example 2

An optical laminate of Example 2 was formed in the same manner, except that using a striped mask, irradiation was adjusted such that the exposure amount in irradiating the region B with light was 30 mJ/cm$^2$ in the method of forming a patterned cholesteric liquid crystal layer of Example 1. In the patterned cholesteric liquid crystal layer of Example 2, the reflection center wavelengths of the region A having a relatively short reflection center wavelength and the region B having a relatively long reflection center wavelength were 550 nm and 610 nm, respectively.

Example 3

An optical laminate of Example 3 was formed in the same manner, except that using a striped mask, irradiation was adjusted such that the exposure amount in irradiating the region B with light was 50 mJ/cm$^2$ in the method of forming a patterned cholesteric liquid crystal layer of Example 1. In the patterned cholesteric liquid crystal layer of Example 3, the reflection center wavelengths of the region A having a relatively short reflection center wavelength and the region B having a relatively long reflection center wavelength were 550 nm and 660 nm, respectively.

Comparative Example 1

An optical laminate of Comparative Example 1 was formed in the same manner, except that in the method of forming a patterned cholesteric liquid crystal layer of Example 1, without light irradiation on the region B using a striped mask, the entire surface of the coating film was subjected to UV irradiation without the mask at 40° C. for 5 seconds with an output of 100% of a D-bulb (lamp: 90 mW/cm$^2$) manufactured by Fusion UV Systems, Inc., such that the entire coating surface was irradiated with light. In this case, the reflection center wavelength was 550 nm.

Example 4

An optical laminate comprising, instead of the patterned cholesteric liquid crystal layer of Example 1, a patterned cholesteric liquid crystal layer in which a first region C having a first reflection center wavelength, a second region D having a second reflection center wavelength, and a third region E having a third reflection center wavelength were periodically arranged was formed as Example 4.

The formation procedure was almost the same as the procedure of Example 1, but as a striped mask, a mask in which the width of a stripe-like opening was 64 μm and the interval between stripe-like openings was 190 μm was used to adjust the exposure amounts of region C to E such that the reflection center wavelengths of the regions C to E were 550 nm, 580 nm, and 610 nm, respectively, and thus a patterned cholesteric liquid crystal layer was formed.

In a case where the lenticular sheet and the patterned cholesteric liquid crystal layer were laminated and bonded, a longitudinal direction of the cylindrical lens of the lenticular sheet was made to coincide with a longitudinal direction of the stripe pattern of the cholesteric liquid crystal layer, such that a top of the cylindrical lens was made to coincide with a center in a width direction of the region C.

Evaluation

Chromaticity of reflected light based on incident light at an incidence angle of 0° and chromaticity of reflected light based on incident light at an incidence angle of 45° were measured to calculate and evaluate a chromaticity difference ($\Delta u'v'$). Incident light obtained by making halogen lamp light parallel by using a collimator lens was applied from the lenticular lens side to the optical laminate. Using BM-5A of TOPCON CORPORATION, chromaticity of reflected light at a reflection angle of 0° was measured in a case where the incidence angle was 0°, and chromaticity of reflected light at a reflection angle of −45° was measured in a case where the incidence angle was 45°.

The chromaticity difference ($\Delta u'v'$) between the reflected light at an incident light angle of 0° and the reflected light at an incident light angle of 45° was evaluated according to the following criteria.
A: less than 0.08
B: 0.08 or greater and less than 0.12
C: 0.12 or greater and less than 0.15
D: 0.15 or greater
Each of A to C is a practically acceptable range, and D is an unacceptable range due to a large shift amount.

Table 1 collectively shows the configurations and the evaluation results of Examples 1 to 3 and Comparative Example 1.

TABLE 1

| | | | | Comparative Example 1 | Example 1 | Example 2 | Example 3 |
|---|---|---|---|---|---|---|---|
| Configuration | Cholesteric Liquid Crystal Layer | Region A | Reflection Center Wavelength (nm) | 550 | 550 | 550 | 550 |
| | | | Half-Width (nm) | 50 | 50 | 50 | 50 |
| | | Region B | Reflection Center Wavelength (nm) | 550 (the same as region A) | 560 | 610 | 660 |
| | | | Half-Width (nm) | 50 | 50 | 50 | 50 |

TABLE 1-continued

|  |  | Comparative Example 1 | Example 1 | Example 2 | Example 3 |
|---|---|---|---|---|---|
| Effect | Chromaticity Difference (Δu'v') Between Reflected Light at Incidence Angle of 0° and Reflected Light at Incidence Angle of 45° | D | B | A | B |

As shown in Table 1, in Examples 1 to 3 comprising a patterned cholesteric liquid crystal layer, it was possible to reduce the chromaticity difference as compared with Comparative Example 1 comprising an unpatterned cholesteric liquid crystal layer, and thus the effect of the configurations of Examples 1 to 3 on the suppression of the short wavelength shift was proved.

It was found that the chromaticity difference in reflected light can be reduced in a case where the difference between the reflection center wavelengths of the long wavelength reflection region and the short wavelength reflection region is in a range of 10 nm to 110 nm. Particularly, in a case where the wavelength difference was about 60 nm as in Example 2, the chromaticity difference was the smallest and the short wavelength shift suppression effect was high.

Table 2 shows the configuration and the evaluation result of Example 4.

TABLE 2

|  |  |  |  | Example 4 |
|---|---|---|---|---|
| Configuration | Cholesteric liquid crystal Layer | Region C | Reflection Center Wavelength (nm) | 550 |
|  |  |  | Half-Width (nm) | 50 |
|  |  | Region D | Reflection Center Wavelength (nm) | 580 |
|  |  |  | Half-Width (nm) | 50 |
|  |  | Region E | Reflection Center Wavelength (nm) | 610 |
|  |  |  | Half-Width (nm) | 50 |
| Effect | Chromaticity Difference (Δu'v') Between Reflected Light at Incidence Angle of 0° and Reflected Light at Incidence Angle of 45° |  |  | A |

It was also possible to obtain a satisfactory short wavelength shift suppression effect even in a case where the cholesteric liquid crystal layer was formed in a pattern of three types of regions as in Example 4.

Regarding Examples 2 and 4, a chromaticity difference (Δu'v') between the reflected light at an incidence angle of 0° and the reflected light at an incidence angle of 23° was evaluated. Example 2 was evaluated to have a level B, and Example 4 was evaluated to have a level A. This is thought to indicate that the short wavelength shift suppression effect is increased by increasing the number of regions.

EXPLANATION OF REFERENCES 10, 20: optical laminate
12: cholesteric liquid crystal layer
12A to 12E: region
14: lenticular lens
15: cylindrical lens

What is claimed is:

1. An optical laminate comprising:
a cholesteric liquid crystal layer; and
a lenticular lens which is laminated on the cholesteric liquid crystal layer,
wherein the cholesteric liquid crystal layer has a plurality of regions which are arranged in a pattern in an arrangement direction of lenses of the lenticular lens and are different from each other in terms of the reflection center wavelength for front incident light, and
among the plurality of regions, a region having the shortest reflection center wavelength is disposed at a focus position of the lenticular lens for the front incident light, and among the plurality of regions, a region having a longer reflection center wavelength is disposed further away from the focus position,
wherein a difference between the reflection center wavelengths of a longest wavelength reflection region and a shortest wavelength reflection region is 10 nm to 110 nm.

2. The optical laminate according to claim 1,
wherein in a lamination direction of the cholesteric liquid crystal layer and the lenticular lens, the region having the shortest reflection center wavelength is disposed at a position overlapping a center of the lens of the lenticular lens, and a region having the longest reflection center wavelength among the plurality of regions is disposed at a position overlapping a boundary between the lenses of the lenticular lens.

3. The optical laminate according to claim 1,
wherein the plurality of regions have the same width in the arrangement direction of the lenses.

4. The optical laminate according to claim 2,
wherein the plurality of regions have the same width in the arrangement direction of the lenses.

5. The optical laminate according to claim 1,
wherein the lenticular lens has a lens pitch of 0.2 mm to 2 mm.

6. The optical laminate according to claim 2,
wherein the lenticular lens has a lens pitch of 0.2 mm to 2 mm.

* * * * *